May 12, 1936.  E. A. WIDMANN  2,040,161

SEED GERMINATING SYSTEM

Filed July 19, 1935  2 Sheets-Sheet 1

INVENTOR.
Eugene A. Widmann
BY
M. W. Loughridge
ATTORNEY.

Patented May 12, 1936

2,040,161

UNITED STATES PATENT OFFICE 2,040,161

SEED GERMINATING SYSTEM

Eugene A. Widmann, New York, N. Y.

Application July 19, 1935, Serial No. 32,303

4 Claims. (Cl. 47—16)

This invention relates to seed germinating, sprouting and plant growing systems. An object of the invention is to increase the speed in which seeds may be sprouted and grown suitable for human and animal feed; another object of the invention is to facilitate the germinating process by softening the seed in water as a preliminary operation to applying a nutrient salt solution to the seed and to the developed roots; another object of the invention is to sprout seed and plants by a nutrient salt solution which is applied intermittently, for comparatively short intervals of time, and in which the liquid may be reconditioned and used a number of times; and another object of the invention is to provide a system of sprouting seeds and plants in which the seeds are intermittently subject to the application of a nutrient salt solution for comparatively short intervals of time and in which a substantially even temperature is maintained in the seed compartments.

A further object of the invention is to provide apparatus for germinating seed and sprouting plants by a liquid fertilizing solution in which the seeds are placed in horizontal compartments, stacked one above the other, with a tank containing the fertilizing solution and arranged to fill each compartment by a gravity feed to the extent desired; another object of the invention is to provide means for draining each of said compartments and another object is to provide labor saving means for cooperatively operating said filling and emptying means; another object of the invention is to subject the seed to the influence of an electric current during the period of growth.

Other objects of the invention will be more particularly understood from the following specification and the accompanying drawings, in which Fig. 1 is an elevation, partly sectioned, showing a machine for applying my invention.

Figure 1:
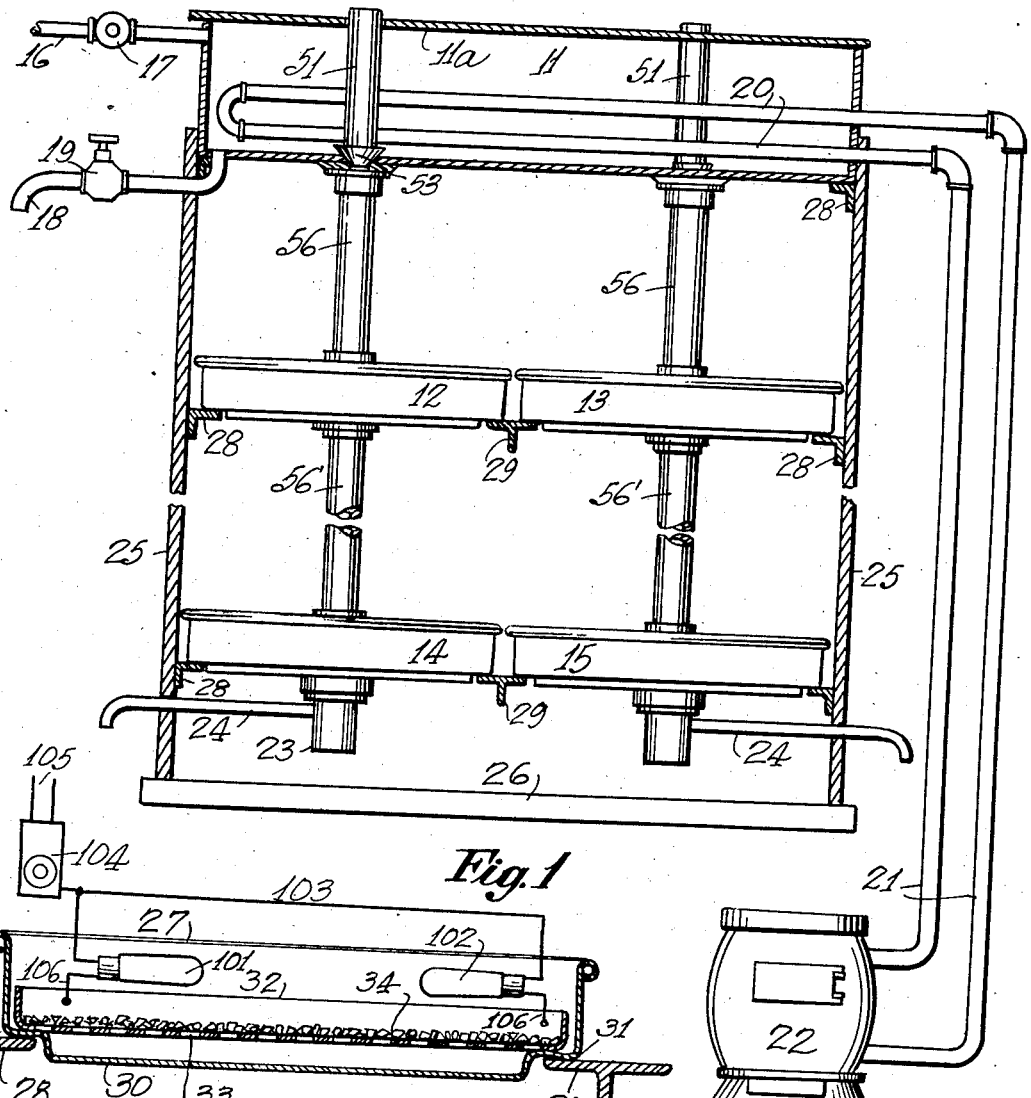

A process for sprouting seeds into edible food products by a nutrient salt solution is disclosed in U. S. Patent 1,950,068, March 6, 1934 and 1,950,701, March 13, 1934. It is found that under favorable conditions the process of these patents will sprout one pound of maize into approximately four and a half pounds of animal feed in approximately ten days time. It has been found that this process can be improved by the use of the present invention, also the process can be somewhat speeded up.

In practicing this invention I first saturate the seed in a separate vessel in ordinary water at normal temperature until it becomes soft, that is, until it becomes ready to sprout. The water is then drained off and the seed is placed in the machine and left in the atmosphere of the machine until the sprouting is completed for the purpose intended. In the machine the seed is saturated with the nutrient salt solution for about one-half hour, twice daily, or it may be saturated for a period of approximately one and a half hours, which may be divided into a plurality of periods. The solution is drawn off after each saturation and the seed or plant is exposed to the atmosphere of the machine in the intervals between the saturation periods. This process is continued uniformly until the product is fully sprouted as intended. The housing of the machine excludes light and excludes a free circulation of air or drafts from without. In practice, the sprouted product will be useable in approximately eight days. The cabinet containing the seed compartments is preferably enclosed by insulating walls.

This process decreases the period of sprouting and growth over that described in the above patents, due to the presaturation of the seed, it makes the final product more uniform and the liquid controlling system makes it less expensive to practice the process. It is found that the seed apparently does not begin to germinate until it has been saturated and softened and that water is as effective for this purpose as the fertilizing solution, and water is cheaper.

The subsequent treatment of the seed for approximately one-half hour night and morning, or the time period most suitable, by the nutrient salt solution produces rapid germination, sprouting and growth in the fertile seed and when the solution is drawn off the heat of the sprouting seed produces an atmosphere in the cabinet in which the growth is maintained until the next period of saturation.

In practice the nutrient salt solution may be applied to the seed by completely saturating the seed, or it may be applied to the seed by partially saturating it and depending upon capillary attraction to spread the solution over the entire seed, or, as soon as the roots develop, the solution may be applied to the roots only and not to the body of the seed. The seed is placed on the perforated bottom of a tray which is placed in the trough that is flushed with the fertilizing solution.

It should be understood that reducing the time necessary for the complete growing of the seed into animal fodder or human food contributes very materially to the successful operation of the system, as the capacity of the machine is thereby materially increased. The system may be practiced with the usual air dried commercial seed available on the market. The cabinet should be substantially air tight, but sealing is not necessary. In addition to the nutrient solution the seed may also be treated while in the cabinet to the stimulating influence of an electric current.

The process is mainly concerned with the treatment of the sprouts as they develop from the seed, and the roots whereby an intensive growth is produced in eight days. A test of maize sprouts after eight days' growth showed the following analysis:

| | Percent dry basis |
|---|---|
| Protein | 22.50 |
| Fat | 2.50 |
| Fiber | 11.00 |
| Nitrogen free extract | 59.00 |
| Ash | 5.00 |

In a single machine the process is carried out in compartments corresponding to the number of days necessary for the complete growth of the seed. After the process is established, one compartment is "harvested" and then loaded with the softened seed each day and the intermediate compartments are progressively developed to the final stage. Of course, in large installations a separate machine may be used for each day's maturing growth so that the entire contents of a machine will be removed and the machine loaded at the same time as the growth reaches maturity.

One apparatus for carrying out this process is illustrated in the drawings and comprises a tank or receptacle for the nutrient solution that is used to stimulate the growth. The liquid is supplied from this tank at a substantially uniform temperature, 80° F., has been found to give good results in winter and a somewhat lower temperature may be used in summer. The temperature is regulated by a heating coil in winter and in warm weather it may be reduced by the addition of cold water to the liquid before it is drawn off. The tank is mounted on a frame which supports a vertical tier of horizontal troughs below the tank. The general construction may follow that shown in application Serial No. 853, filed January 8, 1935. An arrangement of control is provided for supplying liquid to the troughs from the tank and for independently emptying the liquid from the troughs.

The seed to be germinated or sprouted is placed on suitable trays having a perforated bottom and these trays are placed in the troughs so that the seed is alternately saturated with the liquid and drained of the liquid. The entire apparatus is enclosed in a housing having walls which are made from heat insulating material, which are light proof and which are substantially air tight. The moisture in the troughs and the sprouting seed produces an atmosphere which is preferably confined within the housing and facilitates the process.

In the drawings, 11 is the tank provided with a cover 11a and is connected with a water supply pipe 16, controlled by the valve 17. A waste pipe 18 controlled by the valve 19 is provided for emptying the tank. The liquid supplied to the tank is treated with the nutrient salts suited to the particular kind of seed that is to be germinated.

On a lower level than the liquid tank the troughs 12 and 13 are provided supported on the frames 28 and 29 and below the troughs 12 and 13 the troughs 14 and 15 are provided, the construction it will be observed, provides two vertical tiers of troughs which may comprise any number of intermediate troughs corresponding to 12 and 13, with the troughs 14 and 15 at the bottom. The tank 11 is heated by the manifold 20 connecting by pipes 21 with the pot stove 22 which may have a regulated draft of the usual type.

Figure 2:
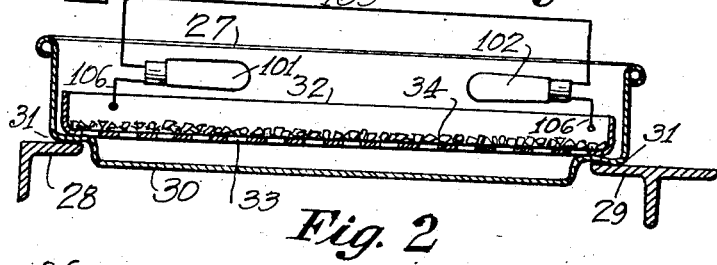
Fig. 2 is a transverse section of a seed tray and trough, with ray emitting tubes.
Figure 2A:
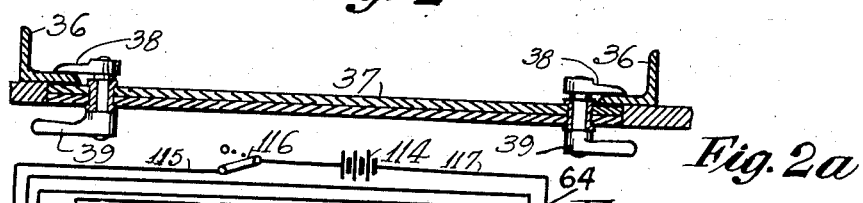
Fig. 2a is a sectional detail of the door and fastening for one of the compartments.

The troughs are enclosed by the tank 11 at the top, by the heat insulating walls 25 on the sides and by the base 26. Suitable doors are provided to insert and remove the trays from the troughs, one form of which is indicated in Fig. 2a, comprising the double sheet of insulating board 37, having cleats 38 at each side arranged to engage the vertical angles 36 of the frame and which may be released by the handles 39 so that the door panel can be removed.

From the cross section of the trough in Fig. 2, it will be noted that the trough 27 is formed from sheet metal and is provided with shoulders at 31 to rest upon the angle frame 28 and 29 and is provided with a depressed bottom 30 providing for the free flow of the liquid below the seed tray 32 and into which the roots project. The seed trays 32 are comparatively shallow and have a perforated bottom as indicated at 33 upon which the seed 34 is spread in a layer. These trays are made a convenient size to be easily inserted and removed from the trough. Where it is desired to take advantage of the stimulating properties of X-rays, Violet Rays or the like for the seed in the trays, ray emitting tubes 101 and 102 may be placed above the seed trays and connected electrically with the seed trays as indicated at 106 and controlled by a circuit 103 and the control device 104 from the electric supply 105 as desired. The electrical apparatus for producing rays of this kind is well known and is not detailed in the drawings.

Figure 2B:
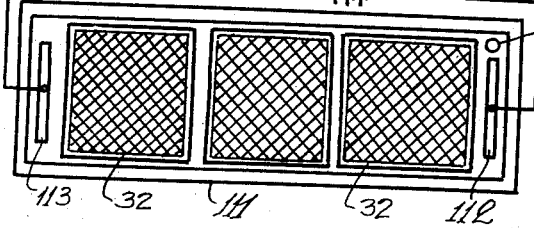
Fig. 2b is a plan of a trough with seed trays to which an electric current is applied.

In Fig. 2b the trough 111 is made from nonconducting material and is provided with the electrode 112 at one end and 113 at the opposite end. These plates are immersed in the nutrient liquid which saturates the seed trays 32 and are connected to the source of current 114 by wires 115 and 117, the circuit of which is controlled by switch 116. The trays may be made of perforated sheet metal or wire mesh according to the kind of seed used.

Figures 3, 4, 5, 6:
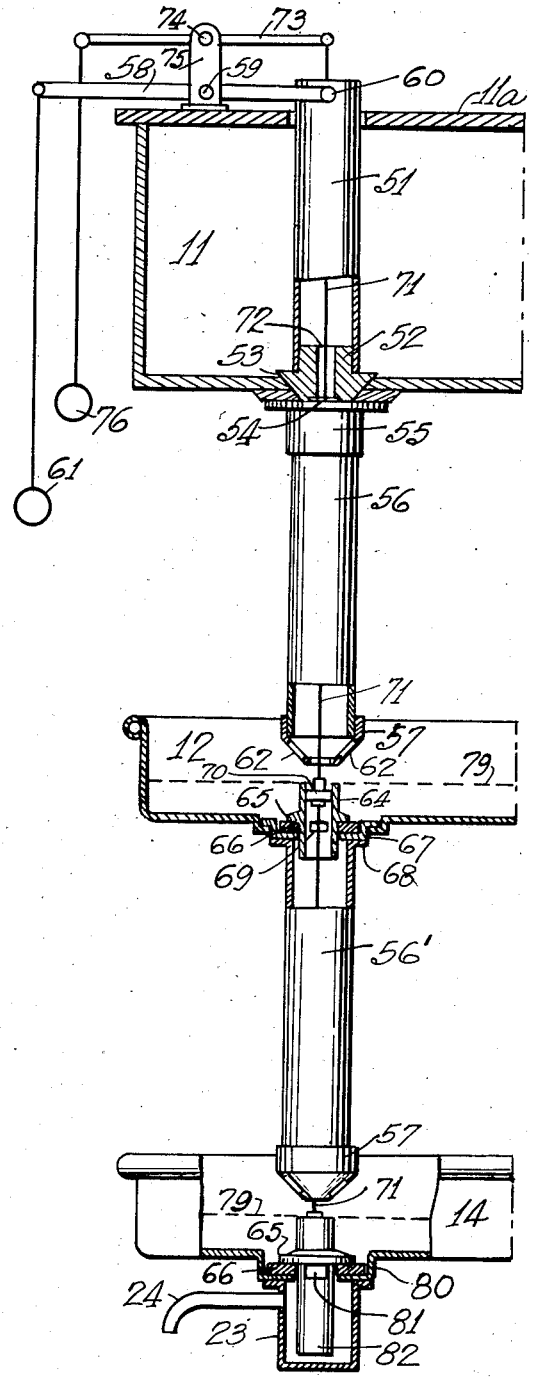
Fig. 3 is an elevation of the liquid control system, partly sectioned, for filling the troughs from the tank and for emptying these troughs.
Fig. 4 is a nozzle for the discharge pipe in Fig. 3.
Fig. 5 is a view of the top of the discharge valve in Fig. 3.
Fig. 6 is a modification of the discharge nozzle for Fig. 3.

In the form shown in Fig. 3, the liquid from the tank 11 is supplied to the vertical tier of troughs in what may be termed a series arrangement. A discharge pipe from the tank supplies liquid to the first trough and through an overflow valve, liquid from this trough is fed through a second discharge pipe to the next trough and so on for each trough of the tier. These discharge pipes are placed in vertical alignment but in order to distribute the flow of the liquid to more than one trough at a time, the nozzle of the discharging end of the connecting pipe is provided with a baffle which deflects part of the liquid into the trough and part of it directly through the overflow valve.

A trough with seed receptacles similar to that shown in Fig. 2b, and exposed to the ordinary atmosphere, may be used for pre-saturating the seed with water. In this case the electrical apparatus shown in this figure is not required.

The overflow valves are made in the form of an open ended cylinder with an exterior annular flange which forms the seat of the valve and rests upon the bottom of the tank. Below the flange an aperture is provided in the wall of the cylinder so that when the valve is unseated or raised on its seat the liquid flows freely through these apertures into the discharge pipe.

A valve is provided for controlling the flow of liquid from the tank to the first discharge pipe. This valve is mounted on the end of a pipe which raises the level of the liquid in the tank and it has a central aperture. Through this aperture a rod or chain extends from the top of tank 11, through each of the discharge pipes and is connected in series to each of the overflow valves. By raising this rod all the overflow valves are unseated at the same time and the troughs are emptied. This operation is made independently of the movement of the valve which controls the discharge from tank 11.

This construction will be understood from Fig. 3, in which 51 is the pipe connected with valve 52 which seats at 53 and closes the intake of the discharge pipe 56. The pipe 51 connects at 60 with the lever 58, pivoted at 59 to the stand 75, mounted on the cover 11a so that the pull rod 61 will unseat valve 52 and permit the free flow of the liquid into the discharge pipe 56. Pipe 56 connects by pipe flange 55 with the bottom of tank 11. The discharge pipe 56 is provided with the nozzle or baffle 57, a view of which, looking downwards, is shown in Fig. 4. This baffle is provided with a central aperture 63 which aligns with the cylindrical overflow valve 64 and with a pair of side apertures 62 which deflects part of the stream into the trough 12 and away from the end of the overflow valve 64.

The overflow valve 64 is provided with a flange 65 and with one or more windows 69 below the flange. This valve seats upon a soft rubber gasket 66 mounted on the plate 67 which rests in a suitable depression in the bottom of tank 12. The discharge pipe 56' is secured to 67 by the flange 68.

The upper end of the overflow valve, Fig. 5, is provided with a spider 70 secured to the upper portion of this valve having apertures 78 for the overflow of the liquid through the valve and having a central aperture 77 in which the operating rod 71 is secured. This rod connects to the lever 73 pivoted at 74 to the standard 75 and is operated by the pull rod 76. The rod 71 passes freely through the central aperture 72 of valve 52 and through pipe 51 and connects with each of and through pipe 51 and connects with each of the overflow valves 64 through the spider 70 for each trough in the vertical tier, thus, pulling on 76 unseats all the overflow valves and drains each trough through the discharge pipe 56'. When the tension on 61 and 76 is released the valves are automatically seated by gravity.

A water seal is provided for the final discharge pipe from the lower troughs through the wall of the housing so that the atmosphere confined within the housing may not escape through this connection. This comprises the closed vessel 23 on the bottom of the lower tank to which the discharge pipe 24 connects. In this vessel the lower end of the overflow valve 82 is placed and the end of this valve does not at any time rise above the intake of pipe 24 so that it is continuously immersed in the fluid, thereby forming a seal or liquid trap.

Another form of deflector for the end of the discharge pipe is shown in Fig. 6, which comprises a cup shaped vessel 86 connected by cleats 85 with pipe 56 and provided with an aperture 88 for the free movement of the rod 71. In this construction all the liquid from pipe 56 is deflected from the end of valve 74 except such as passes through aperture 88. As the stem of the valve 64 is raised it is held in alignment by 86 in which it is a loose fit.

In operation, the valve 52 is unseated by pulling on 61 without disturbing the overflow valves which remain seated. The liquid flows from tank 11 through 56, part of it is deflected through 62 into trough 12 and part of it passes directly through valve 64 into the second discharge pipe 56' and to the next trough and in the same manner to the succeeding troughs. As soon as trough 12 fills up to the level indicated at 79 and determined by the top edge of the overflow valve, the excess liquid flows through the overflow valve to the next trough, there the operation is repeated until all the troughs of the series have been filled to the required level. This level may be such as will saturate the seed 34 in tray 32, or it may be regulated for any level that operating conditions demand.

When it is desired to empty the troughs, the valve 52 remains closed but the pull on 76 raises the overflow valves 64 in each trough at the same time and the liquid flows out through the pipes 56' until all the troughs are drained. The seating of the overflow valve is preferably placed in a depression in the bottom of the trough so that the troughs may be completely drained of the old liquid before a fresh supply is provided. When the tension on 76 is released the overflow valves are seated by gravity.

In the filling process the troughs are filled progressively, the upper troughs being filled and overflowing to fill the lower troughs and, as the troughs may be of considerable capacity, there will be an appreciable time interval between the filling of the top and bottom troughs. In order to substantially equalize the time in which the seed trays are subject to the solution the troughs are emptied progressively from the top to the bottom trough through a time interval corresponding to the time interval in filling. This arises from the upper tanks discharging into the lower tanks in the process of emptying.

It is found that the seed may be saturated twice daily with satisfactory results for periods of about one-half hour each or it may be saturated from one to three times daily, the total saturation time not exceeding about one and a half hours. When the liquid is drawn off it is found that most of the nutrient content has been absorbed and even iodine in the solution will be absorbed in this time. The liquid can be recharged with fresh chemicals and used over again.

This provides a construction in which the supply and the discharge from the troughs is provided through the same pipes, the valves and moving apparatus are enclosed and the system is readily adapted to any number of troughs in the vertical tiers. It will be noted that one operation supplies the liquid to the troughs to a self-regulated height and another operation completely drains these troughs without individual attention to the condition of each trough.

The sprouting in each trough in a single machine is in a different state of maturity. One trough will have seed newly inserted and another will have sprouts within one day of maturity and other troughs will be at intermediate stages in the process. With the treatment described and with the system of liquid control shown, all the troughs are filled at the same time and they are emptied at the same time, with the same interval between operations without regard to the development of the growth and without any change in the character of the nutrient solution for each trough. This simplifies the operation of the system.

Having thus described my invention, I claim:

1. A method of rapidly sprouting seed and promoting plant growth by the use of an open vessel and a closed cabinet, comprising saturating the seed in water in the open vessel exposed to atmospheric conditions until it softens, then removing the water and placing the seed in the closed cabinet and, after an interval, applying a nutrient salt solution to the seed in the cabinet and excluding light and fresh air from one to three times daily for approximately one-half hour each time and maintaining a substantially even temperature for the product during the process.

2. A method of rapidly sprouting seed and promoting plant growth, by the use of an open vessel and a closed cabinet, consisting of saturating the seed in water in the open vessel with access to fresh air and light until said seed softens, then removing the water, then placing the seed in the closed cabinet, excluding light and fresh air from said seed in said closed cabinet, supplying a nutrient salt solution from one to three times daily, first to the seed and then to the roots of the seed only as the roots develop.

3. A method of rapidly sprouting seed by the use of an open vessel and a closed cabinet, comprising saturating the seed in water in the open vessel in the ordinary atmosphere until it softens, removing the water, then placing the seed in the closed cabinet excluding light and fresh air from the seed and supplying a nutrient salt solution to the seed from one to three times daily for short intervals each time and exposing the seed to the atmosphere of the cabinet between the applications of the solution.

4. A method of rapidly sprouting seed by the use of an open vessel and a closed cabinet, comprising saturating the seed in water in the open vessel in the ordinary atmosphere until it softens, removing the water, then placing the seed in the closed cabinet excluding light and fresh air from the seed and applying a nutrient salt solution to the seed from one to three times daily for uniform short intervals each time, exposing the seed to the atmosphere of the cabinet and maintaining a substantially even temperature for the solution during the process.

EUGENE A. WIDMANN.